Dec. 8, 1925.

W. A. LIPPMAN

CAMPING TRAILER

Filed May 2, 1921

Inventor:
WILLIAM A. LIPPMAN,
By John H. Bruninga
His Attorney

Dec. 8, 1925.
W. A. LIPPMAN
1,564,257
CAMPING TRAILER
Filed May 2, 1921  2 Sheets-Sheet 2
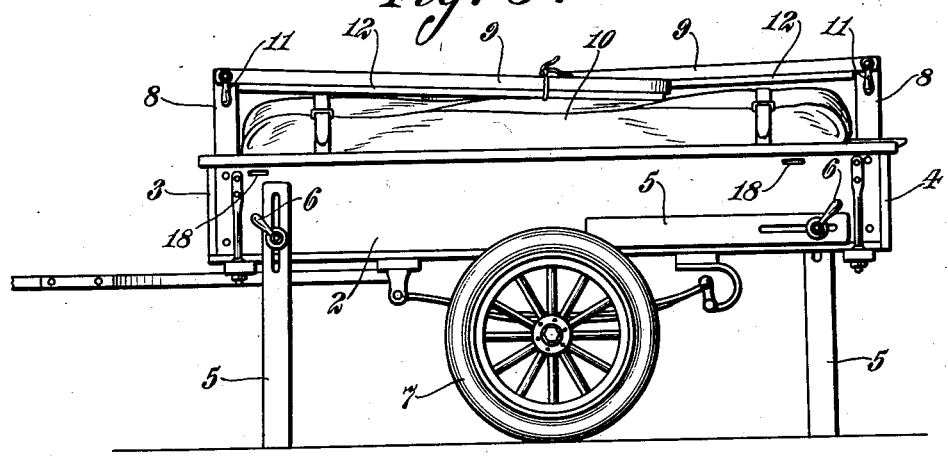
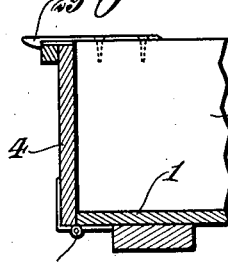 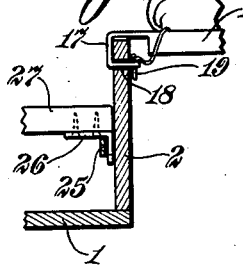 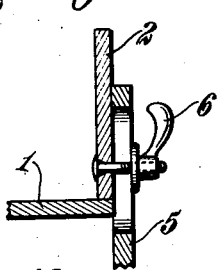 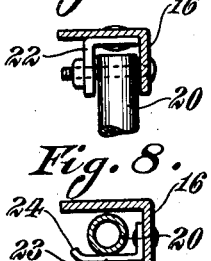
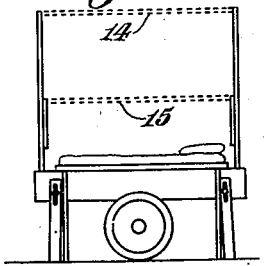 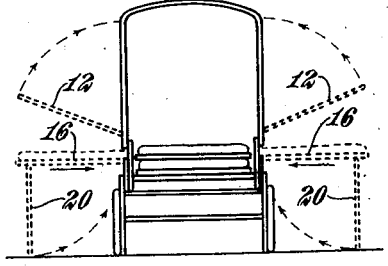 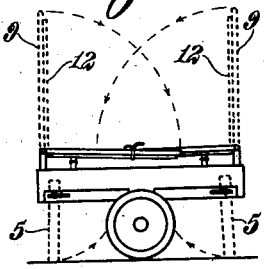
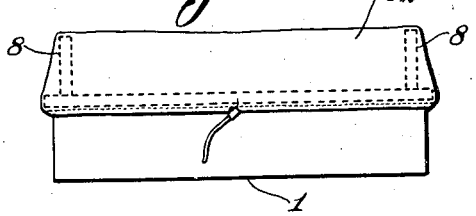
Inventor:
WILLIAM A. LIPPMAN,
By John H. Bruninga
His Attorney Patented Dec. 8, 1925.

1,564,257

UNITED STATES PATENT OFFICE.

WILLIAM A. LIPPMAN, OF ST. LOUIS, MISSOURI.

CAMPING TRAILER.

Application filed May 2, 1921. Serial No. 466,197.

*To all whom it may concern:*

Be it known that I, WILLIAM A. LIPPMAN, a citizen of the United States, and residing at St. Louis, Missouri, have invented the new and useful Improvements in Camping Trailers, of which the following is a specification.

This invention relates to so-called camping trailers which usually consist of some kind of wagon or cart which may be attached to the rear of an automobile in which camping materials may be carried and which are also usually equipped to be formed into a tent to house the campers at night.

One of the objects of this invention is to provide a trailer of this sort in which the parts forming the tent may be readily collapsible to traveling position or raised from traveling position with the least expenditure of time and energy.

Another object of this invention is to provide a camping trailer with beds which may be easily and quickly moved from within the wagon to position for use as beds and vice-versa.

Further objects will appear from the detail description taken in connection with the accompanying drawings, in which:

Figure 3 is a side elevation showing the parts in collapsed position but with the traveling cover removed;

Figure 4 is a detail sectional view showing the method of securing the tail gate;

Figure 5 is a detail showing the means for maintaining the supports in their extended position, and showing also the mounting of the beds for carrying the beds in traveling position;

Figure 6 is a detail showing the method of securing the supporting posts;

Figure 7 is a detail showing the attachment of the outer bed supports;

Figure 8 is a detail showing the method of securing the outer bed supports in traveling position;

Figures 9, 10 and 11 are diagrammatic views showing the steps in folding or collapsing the device, and Figure 12 is a view of the wagon body with the parts in collapsed position and the traveling cover in place.

Figure 1:
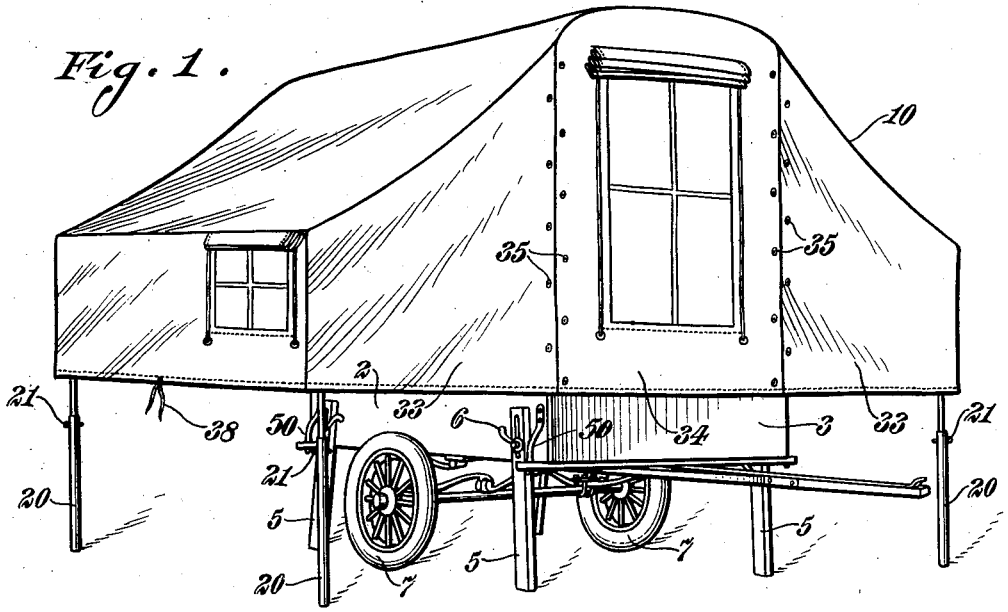
Figure 1 is a perspective view showing the device in extended position with the beds set out and the cover raised.

Referring to the accompanying drawings, 1 designates the traveling body having sides 2, a head gate 3 and a tail gate 4 which may be adapted to be let down in the usual manner of a tail gate. Traveling wheels 7 mounted on springs in the usual manner are provided for traveling. The sides of the body are equipped with adjustable supporting posts 5 which are arranged to be lowered to the ground and clamped in adjusted position by means of clamps 6 so as to maintain the body level. Adjustability of these supports makes it possible to level the body even on rough ground. By swinging the legs 5 over against the braces 50 as stops to prevent further pivotal movement in that direction, as shown in Figure 1, the body will be secured against any tendency to roll on the wheels 7.

Attached to the sides 2 are four stanchions 8. Pivoted at the top of each pair of stanchions, one at the front and one at the rear, is a pair of arches 9. These arches may be swung on their pivots toward and from each other to collapsed position for traveling or to extended or upright position for supporting the tent cover 10, shown extended for use in Figure 1 and in dotted outline in Figure 2. The arches may be secured in either position by means of clamps 11 at the pivots. Pivoted to the legs of the arches are four arms 12. These arms are pivoted to the arch legs near the bottom and are arranged to fold on said pivots to a position against the arch leg as indicated in Figure 10. When in extended position these arms are supported in that position by straps 13 attached to the arch legs.

Figure 2:
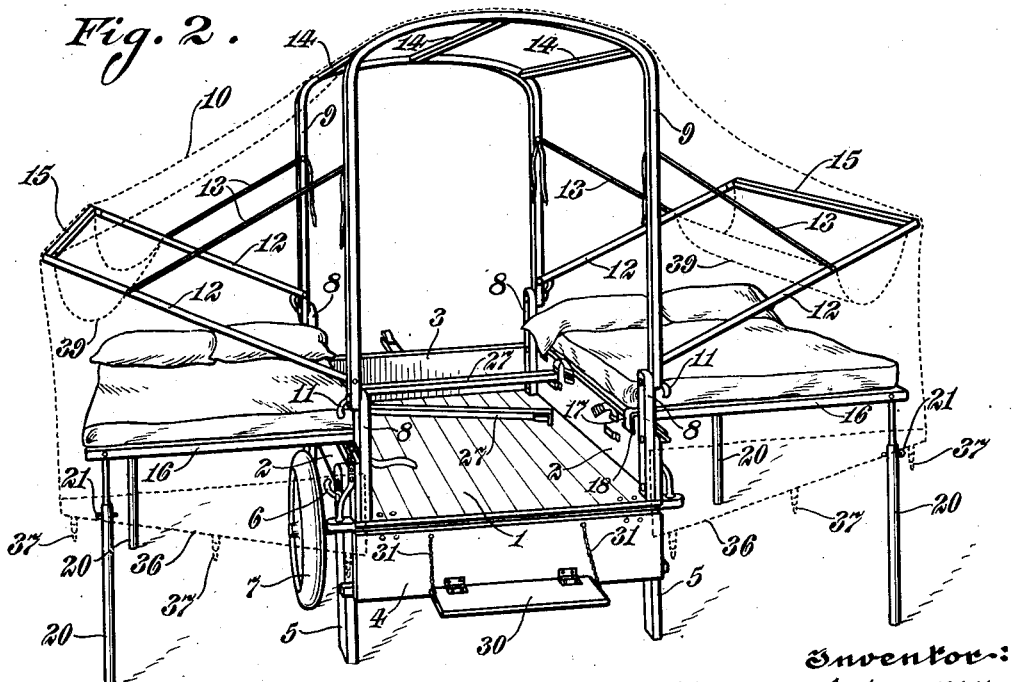
Figure 2 is a view similar to Figure 1, but with the cover removed showing the frame work.

A series of poles 14 are removably attached at each end to the arches 9 so as to join said arches at the top. Three of these poles are shown in Figure 2, one joining the centers of the arches and one at each upper corner thereof. These poles serve to brace the arches in extended position and to support the tent cover 10 between the arches. Similar poles 15 are removably attached to the ends of each pair of arms 12 so as to brace those arms in extended position and to support the outer edges of the tent cover over the beds. This is clearly shown in Figure 2.

A pair of beds is provided, each comprising a bed-spring 16 of usual design provided at the edges of the frame thereof with securing fasteners or hooks 17 which are adapted to engage slots 18 in the sides 2 when the beds are in extended position as shown in Figure 2. The ends of the hooks 17 are long enough to extend through the sides 2 and are perforated to receive locking pins 19, Figure 5, to prevent their being accidently disengaged. The outer corners of each frame or bedspring 16 are provided with adjustable supports 20 which may consist of a pair of telescoping tubes perforated at intervals to receive pins for adjusting the heighth thereof. These supports may be attached to the frame 16 by means of an angle-bracket 22 and a bolt as shown in Figure 7. These supports are thus capable of being folded to a position within the end member of the frame 16 as in Figure 8, being maintained in that position by a spring-bracket 23 having an up-turned lip 24 to prevent the escape of the support. At intervals along the sides 2 are brackets 25 adapted to be engaged by clips 26 on the ends of a pair of supports 27 which extend across the body, being supported at each end on the sides 2 as shown in detail in Figure 5. These supports are adapted to carry the bedsprings 16 when traveling and are spaced from the bottom of the body 1 so as to provide thereunder a space in which supplies and miscellaneous camping equipment may be carried. A tail gate 4 is hinged at 28 to the body 1 and when in traveling position is turned up against the rear end of the sides 2, in which position it is secured by a pair of spring clips 29 as illustrated in Figure 4. The tail gate 4 may be lowered on the hinge 28 to the position shown in Figure 2. A step 30 is hinged to the gate 4 as shown in Figure 2, being supported in extended position by chains 31 as shown.

The operation of the device is as follows: With the device in extended position, as shown in Figure 1, it is prepared for traveling by first setting the supports 27 in the brackets 25 preparatory to receiving the beds. After removal of the pins 19, each bed may then be slid inwardly across the top of the side 2, said side being shod with metal where engaged by the frame 16, during such sliding movement, and the bed is placed on the supports 27. The other bed is then similarly slid inwardly, the supports 20 in each case being first folded to traveling position, and the second frame 16 is placed upon the first. The beds are thus securely and neatly packed within the wagon body. The poles 14 and 15 may then be detached as indicated in Figure 9 and the arms 12 folded in upon the arch legs as indicated in Figure 10. The tent cover may then be arranged to hang within the wagon body and the arches 9 folded down upon it to collapsed position. If desired, of course, the tent cover 10 may be entirely removed and laid upon the beds before folding in the arches. The tail gate 4 may then be closed to traveling position, the step 30 folding inwardly thereupon during such operation after which the device is in the condition illustrated in Figure 3. The traveling cover 32 may then be applied and secured. The trailer may then be coupled to the automobile after which the supports 5 are folded up to the traveling position shown in Figure 3 and secured by means of the clamps 6. The device is then in condition for traveling.

Upon a halt for the night, reversal of the above operations is carried out. The arches 9 are first set upright and clamped by means of the clamps 11. The arms 12 are extended and the poles 14 and 15 are attached. The beds may then be placed in extended position and the supports 20 adjusted. The tent cover, if not already up, may then be placed over the arches and the poles 15. This tent cover is provided with lateral end portions 33 and middle end portions 34 which may be secured together by fastening means 35 along their adjoining edges. With this arrangement the middle portions 34 may be turned up so as to open the interior of the tent for ventilation during the day time. The lower edges of the lateral portions 33 are provided with flaps 36 adapted to fold underneath the spring 16 attached thereto by clasps 37. A draw string 38 in the hem of the tent cover may also be provided for fastening said cover snugly around the frame 16. A clothes hammock 39 is securely attached at one edge to the interior of the tent cover 10 and adapted to be hung upon the arms 12 so as to provide a receptacle for clothing at night.

In setting up the body for use as a tent, the legs 5 may be moved outwardly so as to bear against the braces 50 at both front and rear ends as shown in Figure 1. This gives the front and rear legs an outward slope and at the same time, the braces 50 act as abutments to prevent pivotal movement of the leg in an outward direction. It will be noted that this effectively insures against any tendency of the body to roll on the wheels 7, since in order to accomplish such rolling motion the body must drag the rear legs 5 and must cause the front legs to pivot at the clamps 6 which, on account of the outward slope of the legs, must be done by raising that end of the body. The body is thus effectively secured against any accidental movement from its place.

It is obvious that various changes may be made in details of construction without departing from the spirit of this invention; it is, therefore, to be understood that this invention is not to be limited to the specific details shown and described.

Having thus described the invention what is claimed is:

1. A camping trailer, comprising, a traveling body having a room floor, an arch arranged at each end of and spanning said body and pivoted thereon to swing towards and from one another, whereby said arches may be extended vertically or collapsed to a horizontal position upon the body, an arm permanently pivoted to the leg of each arch and movable from a position therealong when the arch is collapsed to a position extending transversely therefrom when the arch is extended vertically, and a cover arranged to be supported by said arches and said arms, adapted to provide with said body a camp room.

2. A camping trailer, comprising, a traveling body having a room floor, an arch arranged at each end of and spanning said body and pivoted thereon, to swing towards and from one another, whereby said arches may be extended vertically or collapsed to a horizontal position upon the body, an arm permanently pivoted to the leg of each arch and movable from a position therealong when the arch is collapsed to a position extending transversely therefrom when the arch is extended vertically, poles detachably connecting the ends of said arms and the tops of said arches when extended so as to provide a cover supporting frame, and a cover arranged to be supported by said arches, said arms and poles, adapted to provide with said body a camp room.

3. A camping trailer, comprising, an elongated traveling body having a room floor, an arch arranged at each end of and spanning said body and pivoted thereon to swing towards and from one another, whereby said arches may be extended vertically or collapsed to a horizontal position upon the body, an arm pivoted to the leg of each arch and movable from a position therealong when the arch is collapsed to a position extending transversely therefrom when the arch is extended vertically, poles detachably connecting the ends of said arms and the tops of said arches when extended to provide a cover supporting frame, a bed adapted to slide outwardly on one of the sides of said body to rest thereon at its inner edge when extended, means for interlocking said bed with said side, means engaging the ground for supporting the outer edge of said bed, and a cover supported by said frame and enclosing said body and said bed, adapted to provide a camp room.

In testimony whereof I affix my signature this 28th day of April, 1921.

WILLIAM A. LIPPMAN.